(12) United States Patent
Li et al.

(10) Patent No.: US 12,631,848 B2
(45) Date of Patent: May 19, 2026

(54) LENS MODULE

(71) Applicant: Changzhou AAC Raytech Optronics Co., Ltd., Changzhou City (CN)

(72) Inventors: Fan Li, Changzhou (CN); Hailong Wang, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 288 days.

(21) Appl. No.: 18/518,481

(22) Filed: Nov. 23, 2023

(65) Prior Publication Data

US 2024/0402456 A1 Dec. 5, 2024

Related U.S. Application Data

(63) Continuation of application No. PCT/CN2023/097100, filed on May 30, 2023.

(51) Int. Cl.
G02B 7/02 (2021.01)
(52) U.S. Cl.
CPC .................................... G02B 7/021 (2013.01)
(58) Field of Classification Search
CPC ...................................................... G02B 7/021
USPC ......................................................... 359/819
See application file for complete search history.

(56) References Cited

U.S. PATENT DOCUMENTS

| | | | | |
|---|---|---|---|---|
| 7,768,724 B2 * | 8/2010 | Tsai | ................... | G02B 13/0025 |
| | | | | 359/830 |
| 7,944,632 B2 * | 5/2011 | Wang | ..................... | G02B 7/021 |
| | | | | 359/819 |
| 2005/0280908 A1 * | 12/2005 | Tanaka | ................... | G02B 7/026 |
| | | | | 359/811 |
| 2010/0053781 A1 * | 3/2010 | Wang | ..................... | G02B 7/021 |
| | | | | 359/819 |
| 2010/0214677 A1 * | 8/2010 | Monti | ................... | G02B 7/021 |
| | | | | 359/820 |
| 2019/0170964 A1 * | 6/2019 | Fukumoto | ................ | G02B 7/02 |
| 2020/0158988 A1 * | 5/2020 | Feng | ........................ | G02B 7/021 |
| 2021/0208365 A1 * | 7/2021 | Wang | ..................... | G02B 7/021 |
| 2025/0231466 A1 * | 7/2025 | Kim | ........................ | G03B 17/08 |

* cited by examiner

*Primary Examiner* — Sharrief I Broome
(74) *Attorney, Agent, or Firm* — Wiersch Law Group

(57) ABSTRACT

The present application provides a lens module, including a lens barrel and a lens. The lens barrel includes a first barrel wall enclosed to form a light-through hole and a second barrel wall bent and extended from the first barrel wall. The first barrel wall includes a first wall arranged around the light-through hole and a second wall connecting the first wall to the second barrel wall. The first wall and the lens are spaced apart to form a first gap. The support portion is abutted against the second wall. The first barrel wall is provided with a recess formed by recessed from the second wall. One end of the recess is extended to a junction between the second wall and the second barrel wall, and the other end thereof is in communication with the first gap. This lens module has good exhaust performance and stable optical performance.

7 Claims, 6 Drawing Sheets

120

100

120

120

B-B

120

A

LENS MODULE

CROSS-REFERENCE TO RELATED APPLICATIONS

This application is a continuation of International Application No. PCT/CN2023/097100, filed May 30, 2023, the entire contents of which are incorporated herein by reference.

TECHNICAL FIELD

The present application relates to the technical field of imaging devices, in particular to a lens module.

BACKGROUND

Lens modules are crucial optical components in portable electronic devices. A common lens module includes a lens barrel and a number of lenses accommodated in the lens barrel.

When the lens module in the related art operates in a high-temperature and high-humidity scenario, the gas inside the lens module cannot be excluded, which causes the air gap between the lenses to change audibly, making the field curvature and peak value of the lens module unstable, leading to frequent occurrence of the phenomenon of Not Good (NG) performance, which significantly reduces the optical performance of the lens barrel module when it is applied in a high-temperature and high-humidity environment, thereby affecting the user experience.

Therefore, it is necessary to propose a new lens module to solve the above problems.

SUMMARY

An object of the present application is to overcome the above technical problems and provide a lens module with good exhaust performance and stable optical performance.

In order to achieve the above object, the present application proposes a lens module, comprising:

a lens barrel having an accommodating cavity, comprising:

a first barrel wall enclosed to form a light-through hole; and a second barrel wall bent and extended from the first barrel wall; and a lens accommodated in the accommodating cavity;

wherein the first barrel wall and the second barrel wall are enclosed to form the accommodating cavity; the first barrel wall comprises a first wall arranged around the light-through hole and a second wall connecting the first wall to the second barrel wall; the first wall and the lens are spaced apart in an optical axis direction to form a first gap connected to the light-through hole; the lens comprises an optical portion located at a middle position and a support portion arranged around the optical portion; the support portion is abutted against the second wall; the first barrel wall is provided with a recess formed by recessed from the second wall in a direction away from the lens; one end of the recess is extended to a junction between the second wall and the second barrel wall, and the other end of the recess is extended to be in communication with the first gap.

In one embodiment, the support portion comprises a first surface abutted against the second wall, a second surface abutted against the second barrel wall, and a third surface connecting the first surface and the second surface; the third surface is spaced apart from the lens barrel to form a second gap, and the recess is in communication with the second gap.

In one embodiment, the first barrel wall is provided with at least two the recesses, and the at least two recesses are arranged at equal intervals along a circumferential direction of the second wall.

In one embodiment, the recess has a trapezoidal cross-section along the optical axis direction.

In one embodiment, the recess comprises a recess bottom surface and recess side surfaces arranged on both sides of the recess bottom surface, and a width of the recess decreases gradually from the recess bottom surface towards the second wall.

In one embodiment, each of the recess side surfaces comprises a first connection point connected to the recess bottom surface and a second connection point connected to the second wall; and a spacing distance between two of the first connection points located on the same cross-section is smaller than a spacing distance between two of the second connection points located on the same cross-section.

In one embodiment, the first barrel wall is circular in shape; an angle between two of the first connection points located in the same cross-section is 10°, and an angle between two of the second connection points located in the same cross-section is 20°.

In one embodiment, the recess has a recess depth of 3-5 microns.

In one embodiment, the lens module comprises at least one the lens, and the lens closest to an object side along the optical axis direction is supported on the first barrel wall.

Compared with the related art, the lens module provided by the present application includes a lens barrel and a lens, in which the lens barrel includes a first barrel wall enclosed to form a light-through hole and a second barrel wall bent and extended from the first barrel wall. The first barrel wall includes a first wall arranged around the light-through hole and a second wall connecting the first wall to the second barrel wall. The first wall and the lens are spaced apart in an optical axis direction to form a first gap connected to the light-through hole. The support portion of the lens is abutted against the second wall. The first barrel wall is provided with a recess formed by recessed from the second wall in a direction away from the lens. One end of the recess is extended to a junction between the second wall and the second barrel wall, and the other end of the recess is extended to be in communication with the first gap. The provision of the recess can promote gas discharge from the inside of the lens module in high-temperature and high-humidity environments, preventing the air spacing distance among the lenses from changing, and ensuring that the lens module has stable optical performance. Besides, the setting of the recess does not affect the flatness of the second wall, thereby ensuring a high yield in the production of the lens module.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by those of ordinary skill in the art without making creative labor are within the protection scope of the present application.

Figure 1:
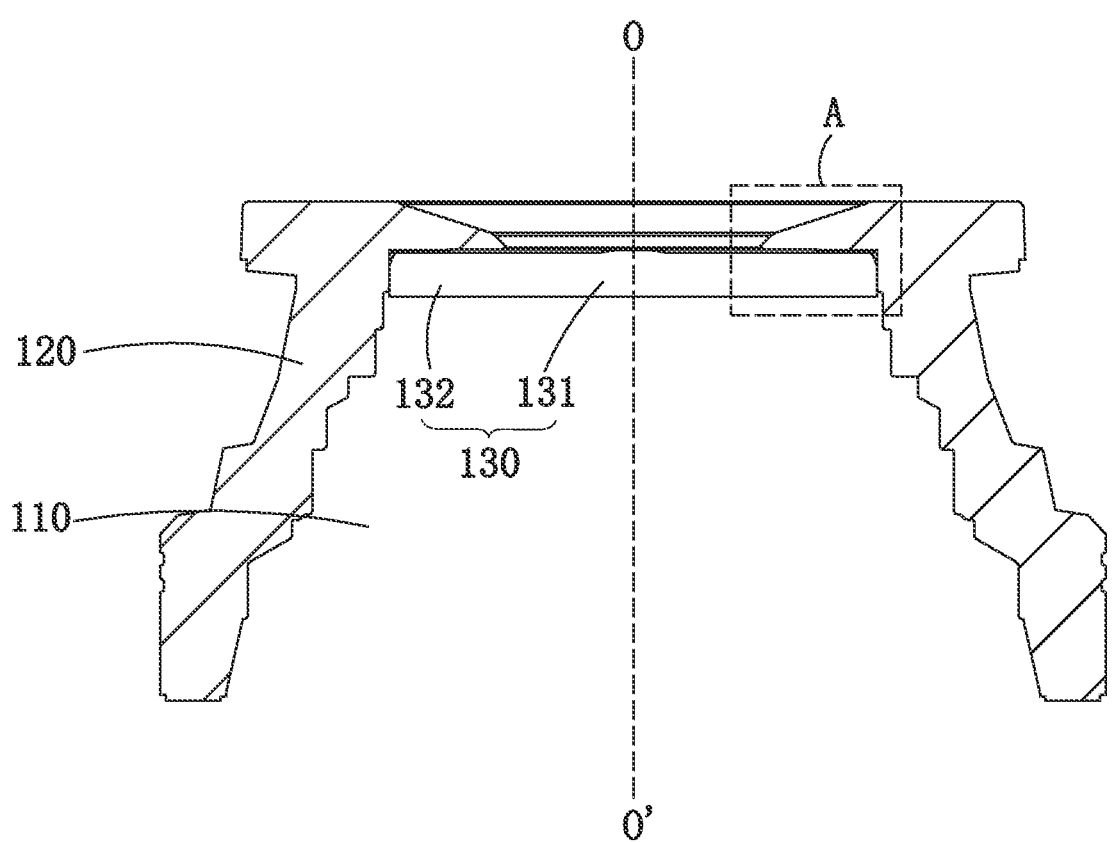
FIG. 1 shows a schematic diagram of a lens module according to an embodiment of the present application.
Figure 2:
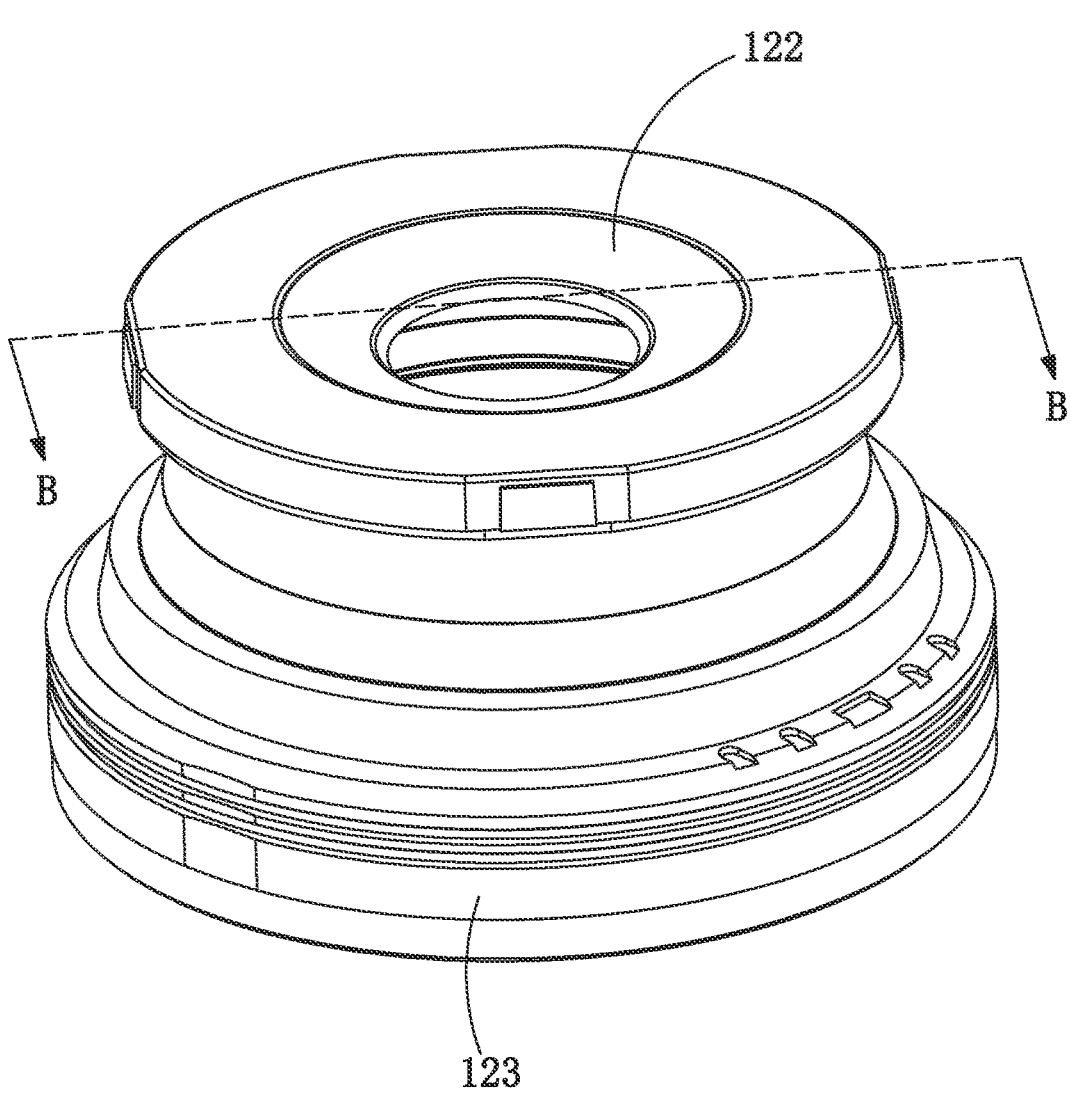
FIG. 2 shows a three-dimensional view of a lens barrel of the lens module according to an embodiment of the present application.
Figure 3:
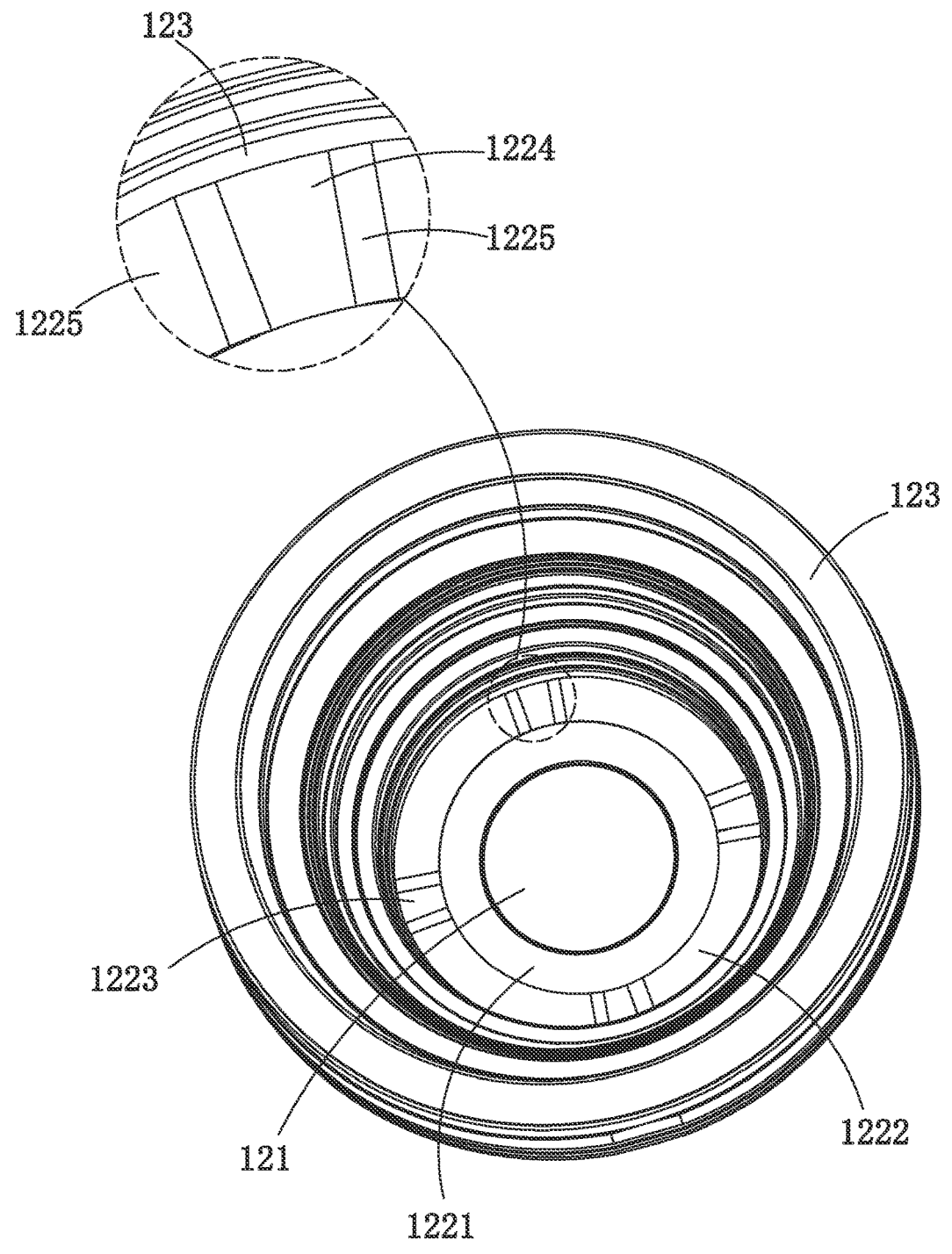
FIG. 3 shows another three-dimensional view of the lens barrel according to an embodiment of the present application.

As shown in FIG. 1, the present application provides a lens module 100, including a lens barrel 120 having an accommodating cavity 110 and a lens 130 accommodated in the accommodating cavity 110.

The specific structure of the lens module 100 in the present application is described below in connection with FIGS. 2-6. Specifically, the lens barrel 120 includes a first barrel wall 122 enclosed to form a light-through hole 121 and a second barrel wall 123 bent and extended from the first barrel wall 122. The first barrel wall 122 and the second barrel wall 123 are enclosed to form the accommodating cavity 110.

In an embodiment, the first barrel wall 122 includes a first wall 1221 arranged around the light-through hole 121 and a second wall 1222 connecting the first wall 1221 with the second barrel wall 123. The first wall 1221 is spaced apart from the lens 130 in an optical axis direction OO' to form a first gap 124 in communication with the light-through hole 121.

The lens 130 includes an optical portion 131 in a middle position and a support portion 132 arranged around the optical portion 131. The support portion 132 is abutted against the second wall 1222. A surface of the support portion 132 oriented toward the object side is abutted against the second wall 1222. The first barrel wall 122 is provided with a recess 1223 recessed from the second wall 123 in a direction away from the lens 130. One end of the recess 1223 is extended to a junction between the second wall 1222 and the second barrel wall 123, and the other end thereof is extended to be in communication with the first gap 124.

The support portion 132 includes a first surface 1321 abutted against the second wall 1222, a second surface 1322 abutted against the second barrel wall 123, and a third surface 1323 connecting the first surface 1321 and the second surface 1322. The third surface 1323 is spaced apart from the lens barrel 120 to form a second gap 125, and the recess 1223 is in communication with the second gap 125. That is, one end of the recess 1223 is in communication with the second gap 125, and the other end thereof is in communication with the first gap 124, so that when the lens module 100 is in the high-temperature and high-humidity scenario, the internal gases can be discharged after passing through the recess 1223 to the first gap 124 and the light-through holes 121, preventing the air spacing distance among the lenses 130 from changing, and ensuring that the lens module 100 has good optical performance.

In an embodiment, the first barrel wall 122 is provided with at least two recesses 1223. The at least two recesses 1223 are arranged at equal intervals along the circumference of the second wall 1222. In this embodiment, the first barrel wall 122 is provided with four recesses 1223.

The recess 1223 has a trapezoidal cross-section along the optical axis direction OO'. Specifically, the recess 1223 includes a recess bottom surface 1224 and recess side surfaces 1225 arranged on both sides of the recess bottom surface 1224. The width of the recesses 1223 decreases progressively from the recess bottom surface 1224 towards the second wall 1222. In other words, each of the recess side surfaces 1225 includes a first connection point 1226 connected to the recess bottom surface 1224 and a second connection point 1227 connected to the second wall 1222. A spacing distance between two of the first connection points 1226 located in the same cross-section is less than a spacing distance between two of the second connection points 1227 located in the same cross-section.

Figure 5:
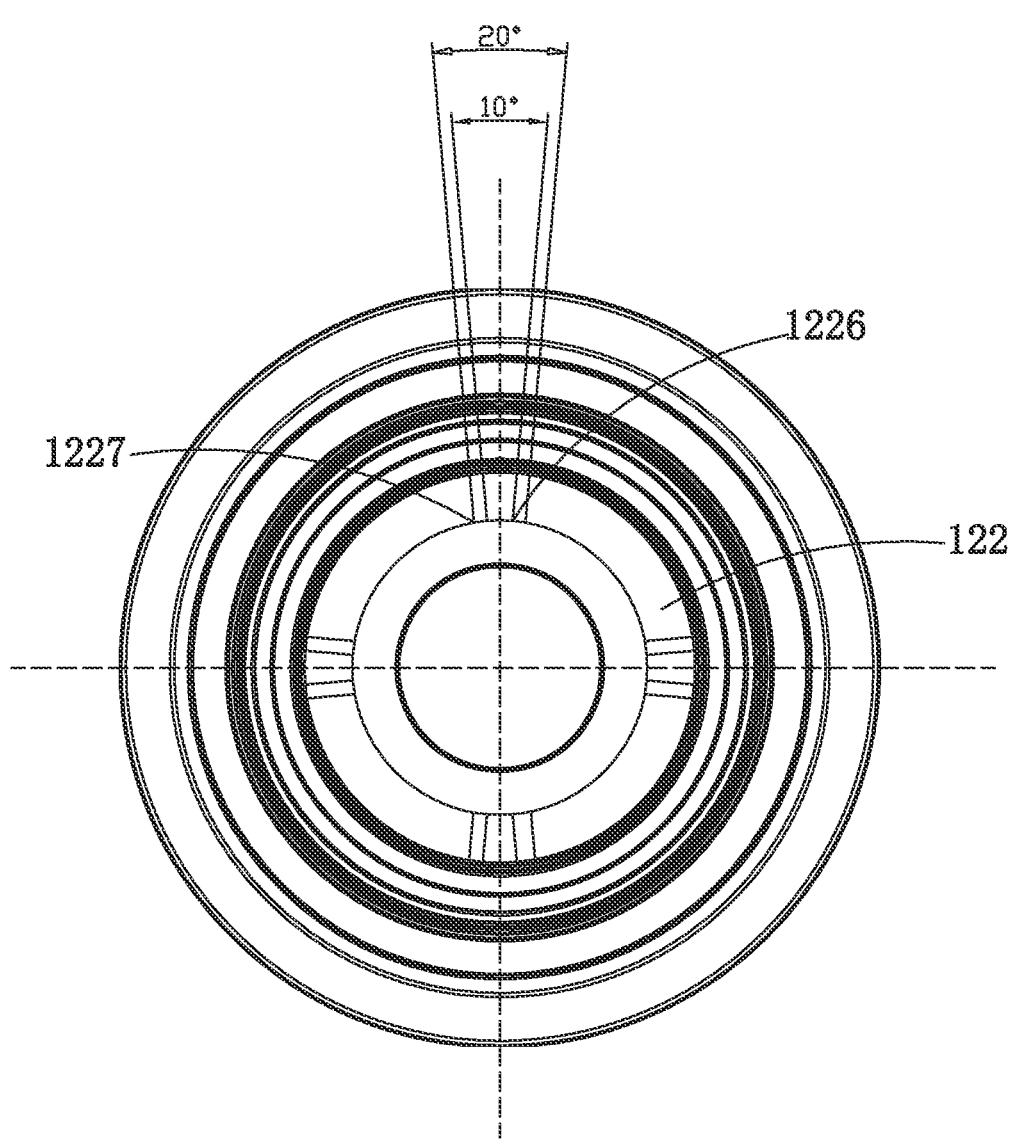
FIG. 5 shows a top view of the barrel of the lens module according to an embodiment of the present application.
Figure 6:
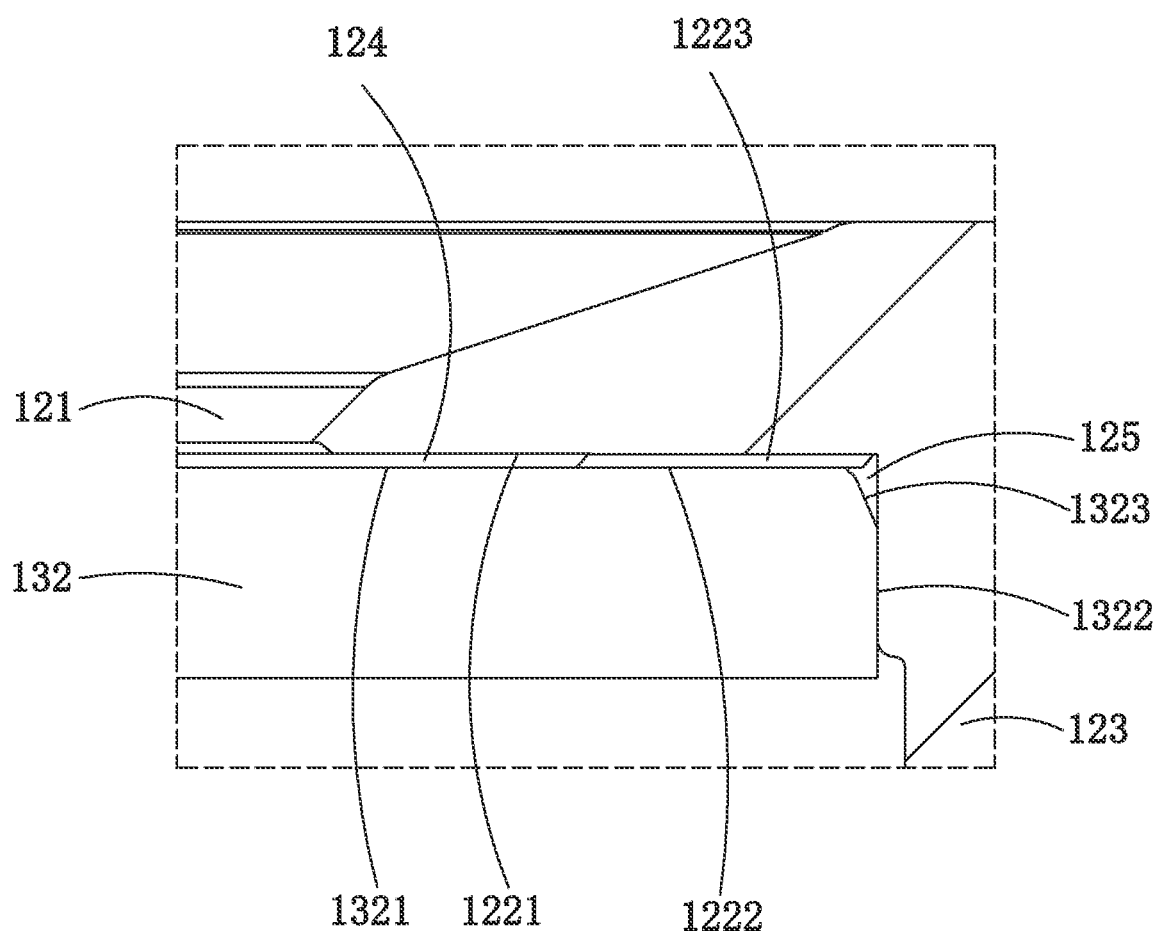
FIG. 6 is an enlarged view of part A in FIG. 1.

In this embodiment, as shown in FIG. 5, the lens barrel 120 is cylindrical. Correspondingly, the first barrel wall 122 is cylindrical. An angle between two of the first connection points 1226 located on the same cross-section is 10°, and an angle between two of the second connection points 1227 located on the same cross-section is 20°.

Figure 4:
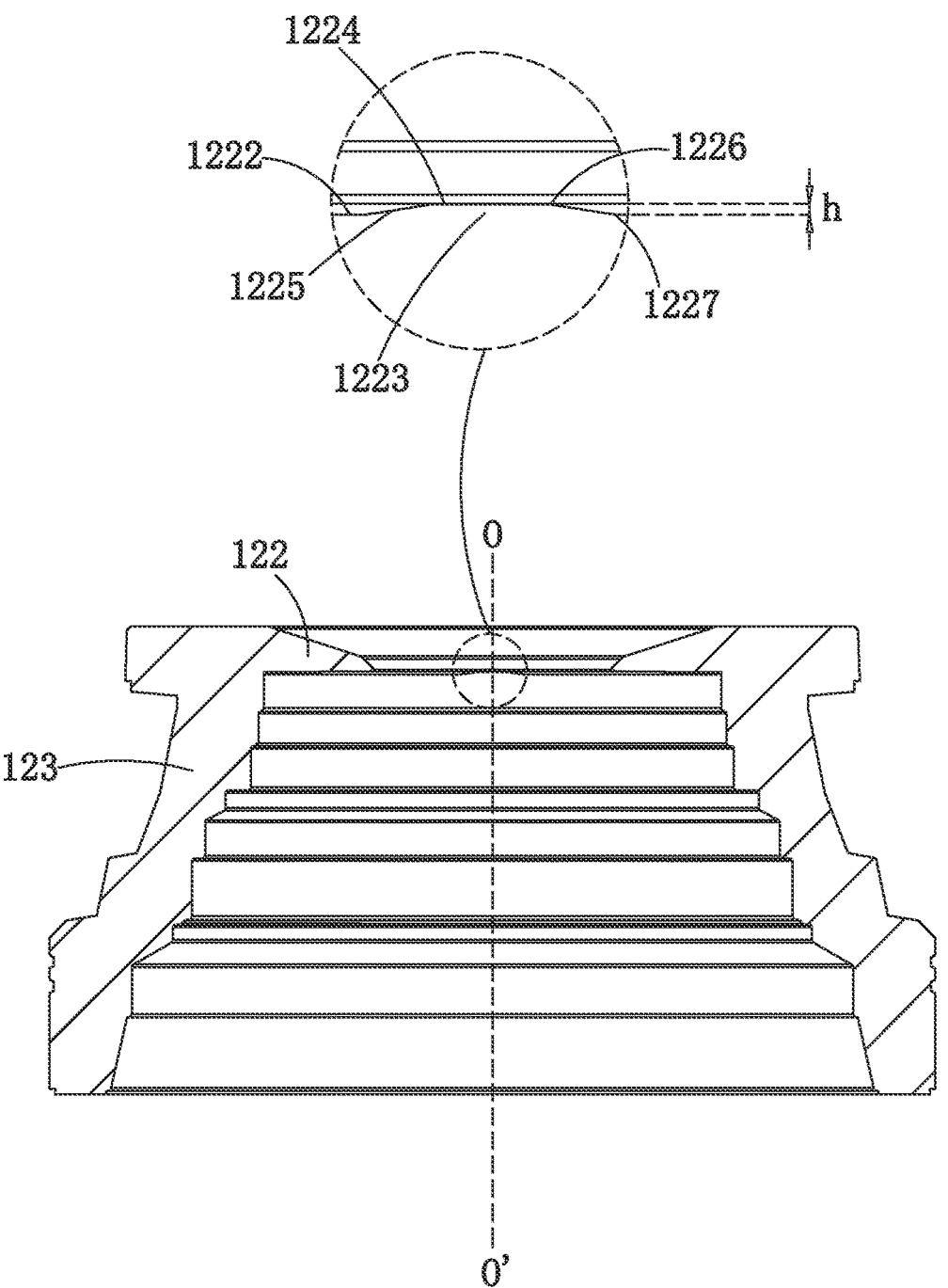
FIG. 4 shows a sectional view along line B-B in FIG. 2.

In order to make the lens module 100 have sufficiently good venting properties, the recess 1223 has a recess depth of 3-5 microns. As shown in FIG. 4, it should be understood that the recess depth is the vertical distance h from the second connection point 1227 to the recess bottom surface 1224 along the optical axis direction. With this arrangement, the first barrel wall 122 still maintains a good flatness, which enables the lens module 100 to ensure a high yield during production. The number of the recesses 1223, the depth of the recesses, and the shape of the cross-section may be adjusted according to the practical requirements.

It should be understood that the lens module 100 includes at least one lens 130. The lens 130 closest to the object side along the optical axis direction is supported on the first barrel wall 122. In this embodiment, one lens 130 is shown as an example for illustration.

Compared with the related art, the lens module provided by the present application includes a lens barrel and a lens, in which the lens barrel includes a first barrel wall enclosed to form a light-through hole and a second barrel wall bent and extended from the first barrel wall. The first barrel wall includes a first wall arranged around the light-through hole and a second wall connecting the first wall to the second barrel wall. The first wall and the lens are spaced apart in an optical axis direction to form a first gap connected to the light-through hole. The support portion of the lens is abutted against the second wall. The first barrel wall is provided with a recess formed by recessed from the second wall in a direction away from the lens. One end of the recess is extended to a junction between the second wall and the second barrel wall, and the other end of the recess is extended to be in communication with the first gap. The provision of the recess can promote gas discharge from the inside of the lens module in high-temperature and high-humidity environments, preventing the air spacing distance among the lenses from changing, and ensuring that the lens module has stable optical performance. Besides, the setting of the recess does not affect the flatness of the second wall, thereby ensuring a high yield in the production of the lens module.

Described above are only some embodiments of the present application, and it should be noted herein that improvements may be made by those of ordinary skill in the art without departing from the inventive conception of the present application, but all of these fall within the protection scope of the present application.

What is claimed is:

1. A lens module, comprising:

a lens barrel having an accommodating cavity, comprising:

a first barrel wall enclosed to form a light-through hole; and a second barrel wall bent and extended from the first barrel wall; and a lens accommodated in the accommodating cavity;

wherein the first barrel wall and the second barrel wall are enclosed to form the accommodating cavity; the first barrel wall comprises a first wall arranged around the light-through hole and a second wall connecting the first wall to the second barrel wall; the first wall and the lens are spaced apart in an optical axis direction to form a first gap connected to the light-through hole; the lens comprises an optical portion located at a middle position and a support portion arranged around the optical portion; the support portion is abutted against the second wall; the first barrel wall is provided with a recess formed by recessed from the second wall in a direction away from the lens; one end of the recess is extended to a junction between the second wall and the second barrel wall, and the other end of the recess is extended to be in communication with the first gap; the recess has a trapezoidal cross-section along the optical axis direction; the recess comprises a recess bottom surface and recess side surfaces arranged on both sides of the recess bottom surface, and a width of the recess decreases gradually from the recess bottom surface towards the second wall.

2. The lens module of claim 1, wherein the support portion comprises a first surface abutted against the second wall, a second surface abutted against the second barrel wall, and a third surface connecting the first surface and the second surface; the third surface is spaced apart from the lens barrel to form a second gap, and the recess is in communication with the second gap.

3. The lens module of claim 1, wherein the first barrel wall is provided with at least two the recesses, and the at least two recesses are arranged at equal intervals along a circumferential direction of the second wall.

4. The lens module of claim 1, wherein each of the recess side surfaces comprises a first connection point connected to the recess bottom surface and a second connection point connected to the second wall; and a spacing distance between two of the first connection points located on the same cross-section is smaller than a spacing distance between two of the second connection points located on the same cross-section.

5. The lens module of claim 4, wherein the first barrel wall is circular in shape; an angle between two of the first connection points located in the same cross-section is 10°, and an angle between two of the second connection points located in the same cross-section is 20°.

6. The lens module of claim 1, wherein the recess has a recess depth of 3-5 microns.

7. The lens module of claim 1, wherein the lens module comprises at least one the lens, and the lens closest to an object side along the optical axis direction is supported on the first barrel wall.

* * * * *